(12) United States Patent
Perotto et al.

(10) Patent No.: US 6,460,461 B2
(45) Date of Patent: Oct. 8, 2002

(54) HYBRID GENERATOR WITH PERFORATING PILLAR AND TWO-TUBE BODY

(75) Inventors: Christian Perotto, Ballancourt; Christophe Haegeman, Palaiseau; Franck Le Baudy, Lardy, all of (FR)

(73) Assignee: Livbag SNC, Vert-le-Petit (FR)

( * ) Notice: Subject to any disclaimer, the term of this patent is extended or adjusted under 35 U.S.C. 154(b) by 0 days.

(21) Appl. No.: 09/849,480

(22) Filed: May 7, 2001

(65) Prior Publication Data

US 2002/0007755 A1 Jan. 24, 2002

(30) Foreign Application Priority Data

May 30, 2000 (FR) .............................................. 00 06924

(51) Int. Cl.⁷ .............................. C06D 5/06; B60R 21/26
(52) U.S. Cl. ...................... 102/288; 102/289; 102/290; 102/530; 280/737
(58) Field of Search ............................. 102/288, 289, 102/290, 530; 280/737

(56) References Cited

U.S. PATENT DOCUMENTS

| | | | |
|---|---|---|---|
| 3,690,695 A | | 9/1972 | Jones, Sr. ............. 280/150 AB |
| 5,464,247 A | | 11/1995 | Rizzi et al. ................. 280/737 |
| 5,653,463 A | * | 8/1997 | Jeong ..................... 280/737 X |
| 5,675,102 A | * | 10/1997 | Hamilton et al. ....... 102/288 X |
| 5,763,817 A | * | 6/1998 | Renfroe et al. ......... 102/288 X |
| 5,821,448 A | * | 10/1998 | Hamilton et al. ........... 102/288 |
| 5,918,900 A | * | 7/1999 | Ennis ..................... 102/289 X |
| 6,148,610 A | * | 11/2000 | Calabro et al. ......... 280/288 X |

FOREIGN PATENT DOCUMENTS

| | | |
|---|---|---|
| DE | A1 1995 45 077 | 6/1997 |
| EP | A1 1 053 915 | 11/2000 |
| JP | 10 250 525 | 9/1998 |
| WO | WO 98/09850 | 3/1988 |
| WO | WO 98/12078 | 3/1998 |

* cited by examiner

*Primary Examiner*—Peter A. Nelson
(74) *Attorney, Agent, or Firm*—Oliff & Berridge. PLC

(57) ABSTRACT

The present invention relates to the field of hybrid gas generators intended to inflate a protective airbag.

The generator (1) consists of two metal tubes (50, 51) welded together, the upstream tube (50) being of one piece with an internal partition (26) that has a central orifice (27) closed by a diaphragm (28). The generator thus has a reservoir chamber (29) containing a pressurized gas and a combustion and mixing chamber (46) containing a pyrotechnic device (4) and a support piece (30) carrying a piston-pillar (31) the stroke of which is limited.

The hot gases cannot enter the reservoir chamber (29) which may thus contain a greater amount of gas.

8 Claims, 5 Drawing Sheets

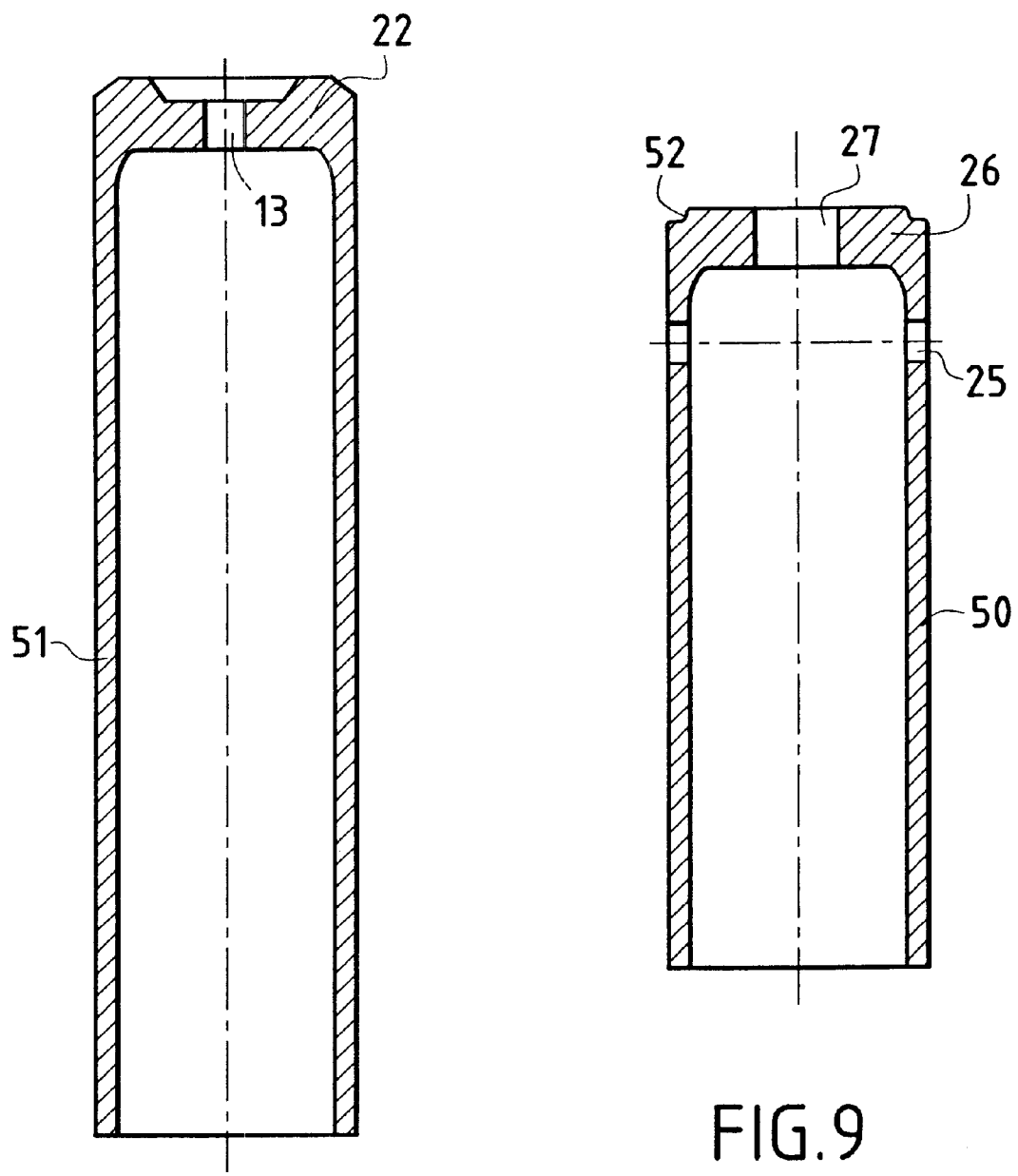

HYBRID GENERATOR WITH PERFORATING PILLAR AND TWO-TUBE BODY

The present invention relates to the field of protecting the occupants of a motor vehicle using an inflatable airbag. More specifically, the invention relates to a hybrid gas generator of tubular shape for inflating such an airbag.

In order to inflate an airbag to protect the occupants of a motor vehicle, use has been made, in the past, of pressurized gas reservoirs opened by a pyrotechnic valve. Thus, U.S. Pat. No. 3,690,695 describes a device for inflating a protective airbag. This device consists of a reservoir of gas under pressure which is isolated from the duct leading to the airbag by a gastight diaphragm against which a finned solid piston rests.

In the event of a collision, a pyrotechnic primer placed behind the piston causes the piston to move forward, tear the diaphragm and allow the pressurized cold gases to enter the said duct. As the hot gases resulting from the combustion of the pyrotechnic charge cannot mix with the cold gases, these are heated up by passing over a bed of magnesium which reacts with them. A device such as this is dangerous in terms of its principle of operation, and has to be produced in a complex way.

Attempts have therefore been made at developing hybrid gas generators containing, on the one hand, a reservoir of cold gases under pressure and, on the other hand, a pyrotechnic charge capable of fulfilling two functions: opening the gas reservoir and heating the cold gases.

PCT application WO98/09850 thus describes a hybrid generator of tubular shape containing a pressurized gas and a piston coupled to a pyrotechnic initiator. In the event of a collision, the triggering of the initiator causes the piston to move and open the generator at its opposite end to the pyrotechnic initiator and also causes the cold gases to heat up by mixing, inside the generator, of these gases with the hot gases supplied by the pyrotechnic initiator. As this takes place, an abrupt rise in pressure inside the generator is observed and, for obvious safety reasons, the amount of gas that can be stored in the generator is limited to well below its theoretical maximum value. Finally, a generator in which the stroke of the piston has to be guided along the entire length of the generator is relatively expensive to produce.

To simplify the actual production of the generator, there has therefore been proposed, for example in PCT application WO98/12078, a type of tubular hybrid generator with lateral gas outlet orifices, the reservoir for pressurized cold gases being located on one side of these orifices, and the pyrotechnic chamber being located on the other side. The gas reservoir is opened by a hollow piston which has a central duct which, after opening, allows the hot gases to enter the reservoir to mix with the cold gases. The heated mixture then leaves the reservoir via the gap around the piston resulting from the breakage of the diaphragm which used to close the reservoir.

Although this solution does indeed yield tubular hybrid generators which are relatively simple to produce, it does not do away with the drawbacks that result from the fact that the hot gases from the combustion of the pyrotechnic charge enter the inside of the reservoir for pressurized cold gases.

This type of drawback is seen also in the solutions which, for opening the reservoir, use a projectile instead of a piston, as described, for example, in U.S. Pat. No. 5,464,247, or again in patent JP 10 250 525, or in those which use a piston with a shaped point as described, for example, in patent DE 19 545 077.

Tubular hybrid generators are particularly wanted for inflating front or side airbags for protecting the passengers of motor vehicles, but those skilled in the art do not currently have such tubular hybrid generators available to them which, simultaneously, are simple to produce and perform all of the mixing of the hot gases originating from the combustion of the pyrotechnic charge with the cold gases stored in the reservoir, outside the latter.

The object of the present invention is precisely to provide such a generator.

The invention therefore relates to a hybrid gas generator comprising a tubular body with an upstream end closed by a pyrotechnic primer and hot-gas-generating device and a downstream end which is closed in a gastight manner, the said tubular body also having gas outlet orifices and containing an internal partition with a central orifice of cross section S closed by a diaphragm, the said partition dividing the said tubular body into two parts:

an upstream part forming a combustion and mixing chamber and containing the pyrotechnic device and the gas outlet orifices, a downstream part forming a reservoir chamber containing at least one presurized gas, characterized in that the said tubular body consists of two cylindrical tubes joined together by one of their ends, the said partition being of one piece with one of the two tubes, and in that the said tubular body thus formed, in its upstream part, between the pyrotechnic device and the internal partition, contains a support piece which is fixed to the said body without coming into contact with the said internal partition or with the said gas outlet orifices and which contains a solid mobile piston consisting of at least one column of cross section s, smaller than the cross section S, which rests against the diaphragm, closing the central orifice of the internal partition, the said column, at its opposite end to the said partition, having a solid base of cross section So larger than S and which bears peripheral ribs preventing the said base from coming into contact with the said central orifice.

It is the particular structure of the generator, in which the internal partition is of one piece with one of the twoltubes that make up the body of the generator which, together with the use of a mobile piston which bears peripheral ribs that prevent the central orifice of the said partition from being blocked off, makes it possible to achieve the objective of the invention. Specifically, once the reservoir chamber has been opened by the column of the mobile piston, the cold gases can leave the reservoir chamber via that part of the central orifice of the internal partition which is left uncovered by the column of the piston to enter the combustion and mixing chamber. At the same time, the widened base of the piston acts as a deflector for the hot gases which originate from the pyrotechnic device. These hot gases cannot enter the reservoir chamber but are made to mix with the cold gases leaving this chamber so as to constitute the gaseous mixture which leaves the generator through its outlet orifices, the structure of the body of the generator giving perfectly reliable operation.

According to a first preferred embodiment of the invention, the said support piece and the said solid mobile piston isolate the said pyrotechnic device from the gas outlet orifices.

This embodiment makes it possible to ensure good protection of the pyrotechnic device and thus good preservation of the generator over time.

According to a second preferred embodiment of the invention, the said support piece consists of a hollow ring crimped against the body of the generator, the said ring having a central cylindrical recess which has an internal shoulder so that it has a diameter $d_1$ facing the pyrotechnic device and a diameter $d_2$ facing the internal partition, $d_2$ being greater than $d_1$, the said ring being extended, facing the internal partition, by a hollow cylindrical neck, the inside diameter of which is equal to $d_2$, and the outside diameter of which is smaller than the inside diameter of the tubular body.

In this case, the said solid mobile piston advantageously consists, ion the one hand, of a cylindrical body which has a cylindrical shank of outside diameter $d_1$, a cylindrical base of outside diameter $d_3$ between $d_1$ and $d_2$ and a cylindrical column of cross section s and of length l and, on the other hand, of fins of height h smaller than the length l which surround the column and which rest on the base of the said cylindrical body, the said fins constituting the peripheral ribs.

In this embodiment, the base of the mobile piston rests on the internal shoulder exhibited by the support ring and the shank of the piston, the height of which has to be less than the stroke of the piston, enters that part of the central recess of the ring which faces the pyrotechnic device. Once the pyrotechnic device has fired, the hot gases begin to drive the solid mobile piston without being able to mix with the cold gases originating from the reservoir chamber. This then yields a hybrid generator which causes the protective airbag to start to deploy using only cold gases.

According to a third preferred embodiment of the invention, the said fins constitute a single piece exhibiting a cylindrical central duct of cross section s, the said piece being force fitted onto the said column of the cylindrical body of the solid mobile piston.

Advantageously, the cylindrical body of the piston will be a metal body and the said single piece will be made of a rigid plastic.

Finally, according to a fourth preferred embodiment of the invention, the two cylindrical tubes that make up the tubular body of the generator have identical outside and inside diameters and are joined together by welding. Advantageously, the internal partition will be of one piece with the tube that forms the upstream part of the generator. This last embodiment actually allows for particularly simple and reliable assembly of the generator according to the invention as will be explained in detail later on in the description.

The invention thus provides a hybrid tubular generator which is simple and inexpensive to assemble. This generator makes it possible to mix the hot gases and the cold gases while at the same time preventing the hot gases from entering the reserve of cold gases. In a given reservoir-chamber volume, it is therefore possible to compress a greater amount of gas than can be stored in a hybrid generator with the same characteristics but which does not exhibit this safety feature.

This possibility is enhanced by the fact that, prior to pyrotechnic operation, the column of the mobile piston rests against the diaphragm which closes the reservoir chamber and acts, with respect to this diaphragm, as a mechanical pillar improving its resistance to pressure.

A detailed description of one preferred embodiment of the invention is given hereinafter with reference to FIGS. 1 to 10.

FIG. 9 depicts, in axial section, the cylindrical tube that constitutes the upstream part of the generator depicted in FIG. 1.

FIG. 10 depicts, in axial section, the cylindrical tube that constitutes the downstream part of the generator depicted in FIG. 1.

Figure 1:
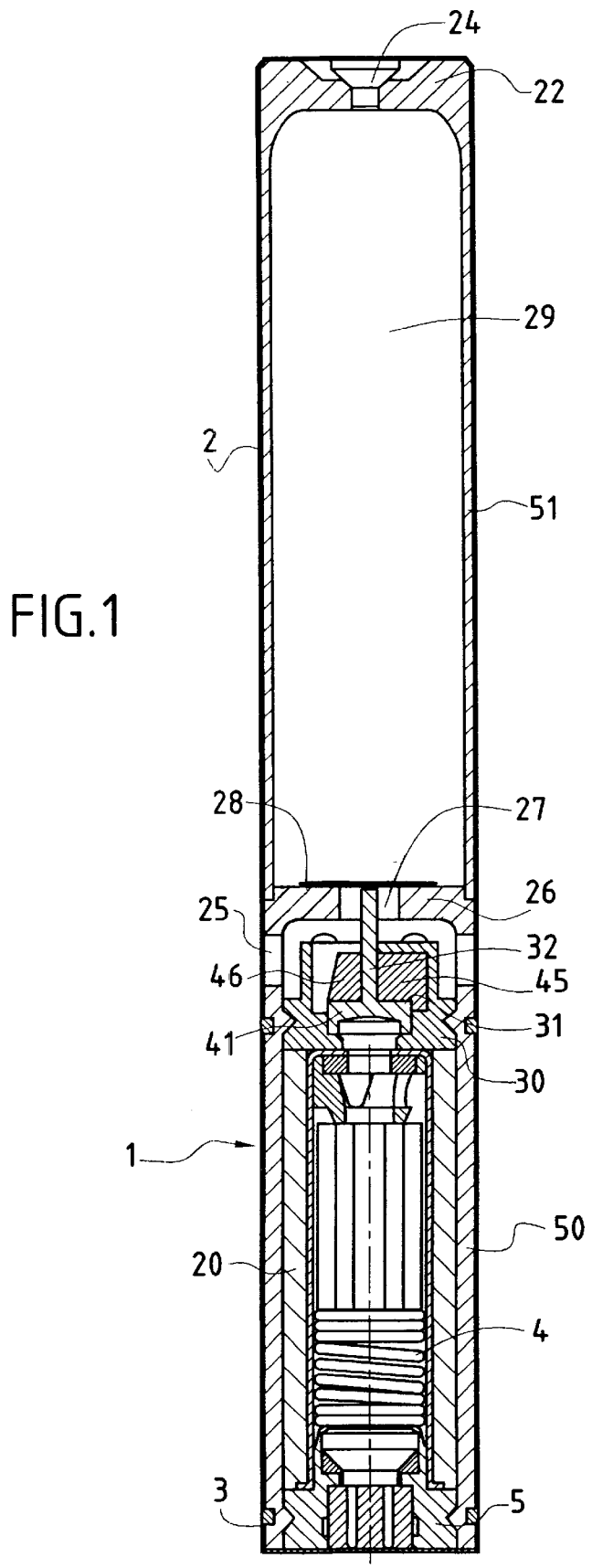
FIG. 1 depicts, in perspective with partial cutaway, a hybrid tubular generator according to the invention.

FIG. 1 depicts a hybrid gas generator 1 according to the invention. This generator comprises a tubuar body 2 consisting of two hollow cylindrical tubes 50 and 51 placed end to end and welded together. The tube 50 which serves to form the upstream part of the generator is closed at one of its ends by a partition 26 which has a central orifice 27. The tube 50 and the partition 26 are of one piece. The partition 26 has an external peripheral shoulder 52 allowing a hollow cylindrical tube 51 of the same diameter and the same thickness as the tube 50 to rest against the partition 26. The two tubes arranged in this way are welded together. The tube 51 also, at its opposite end to the partition 26, has an endpiece 22 which has a central orifice 23. The tube 51 serves to form the downstream part of the generator. The tubes 50 and 51 are made of steel.

Figure 7:
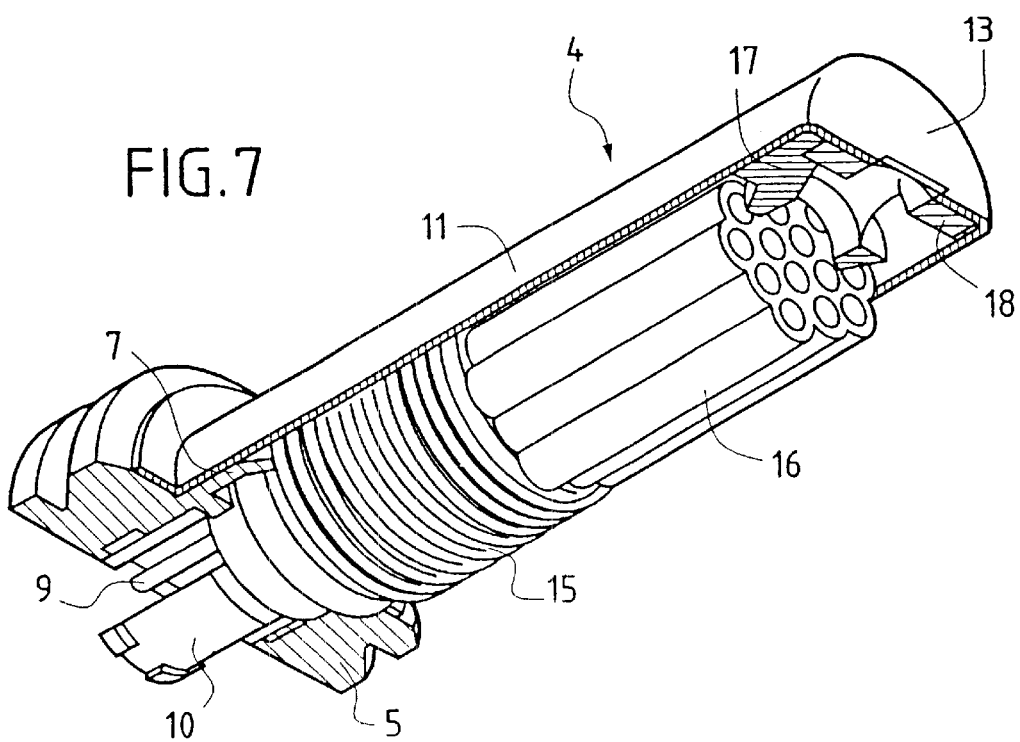
FIG. 7 depicts, in perspective with partial cutaway, the pyrotechnic device of the generator depicted in FIG. 1.
Figure 8:
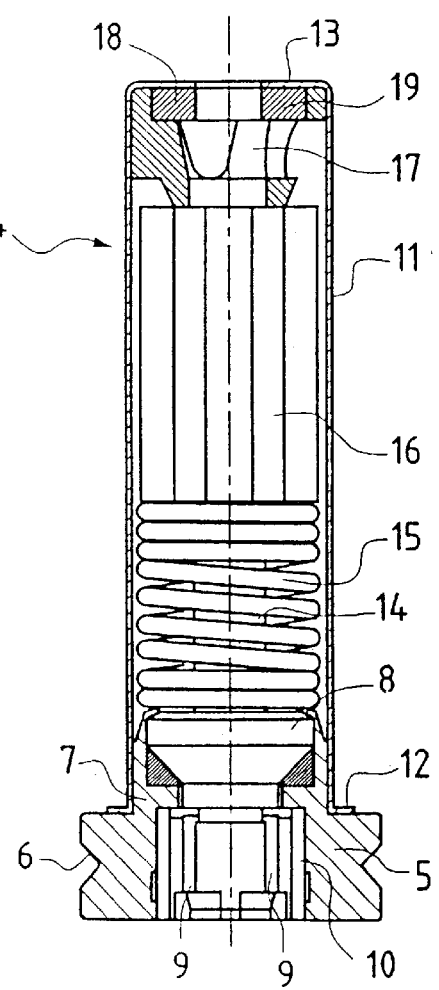
FIG. 8 depicts, in section, the device depicted in FIG. 7.

The tube 50 has an upstream end 3 into which is crimped a hollow metal ring 5 which forms part of a pyrotechnic device 4 which is depicted in detail in FIGS. 7 and 8.

The pyrotechnic device 4 is thus made up of a primer carrier 6 comprising the hollow ring 5 which is extended by a hollow neck 7 into which an electropyrotechnic igniter 8 is crimped, the electrodes 9 of which igniter are protected by a shunt ring 10. A cylindrical metal cap 11 is fitted around the neck 7 and rests on the base 5 via a fared part 12 bonded to the said base 5. At its opposite end to the said fared part 12, the cap 11 has a precut fat face 13 which can open under the effect of an increase in pressure. The igniter 8 has a narrow upper part 14 surrounded by a spring 15 which supports a pyrotechnic charge 16 in the form of a multiperforated lobed block. This block is held at its upper part by a perforated packing piece 17 which supports a disc 18 which comes into contact with the face 13 and has a central orifice 19. The pyrotechnic charge 16 will advantageously consist of a block of composite solid propelant based on ammonium perchlorate and sodium nitrate and containing a silicone binder as described, for example, in U.S. Pat. No. 5,610,444, the cap 11, prior to operation, providing gastight isolation.

As the outside diameter of the cap 11 is smaller than the inside diameter of the tube 50, a tubular spacer piece 20 made of plastic is inserted between the cap 11 and the tube 50 to act as a volume compensator and prevent the cap 11 from exploding sideways when the charge 16 is ignited.

The orifice 23 used for filling the downstream part of the generator with the gases is closed in gastight manner by a plug of weld material 24.

Gases which might be used are inert gases such as nitrogen, argon, helium or mixtures of inert gases and oxidizing gases such as air or argon/oxygen mixtures. The use of such gaseous mixtures containing oxidizing gases is advantageous when the pyrotechnic charge gives off reducing gases.

Downstream of the pyrotechnic device 4, the tube 50 has gas outlet orifices 25, the centres of which are distributed in one and the same radial pane perpendicular to the generatrices of the cylindrical tube 50.

The central orifice 27 of the partition 26 is a circular orifice closed by a diaphragm 28 arranged and fixed on the exterior surface of the said partition.

Thus formed, the generator 1 comprises two distinct parts:

an upstream part containing the primer device 4 with its pyrotechnic charge 16 and the gas outlet orifices 25, this upstream part forming a combustion and mixing chamber 46, a downstream part forming a reservoir chamber 29 intended to contain at least one pressurized gas.

The tube 50 also contains a hollow support piece 30 which comes into contact with the face 13 of the cap 11 of the pyrotechnic device 4. This hollow support piece 30 is fixed to the tube 50 by crimping without coming into contact with the internal partition 26 or with the gas outlet orifices 25. The support piece 30 contains a solid mobile piston 31 which has a column 32 with a cross section smaller than the cross section S of the central orifice 27 borne by the internal partition 26. This column 32 rests against the diaphragm 28 closing the orifice 27 and thus constitutes a pillar which enhances the resistance of the said diaphragm to the pressure of the gases contained in the chamber 29.

Figure 2:
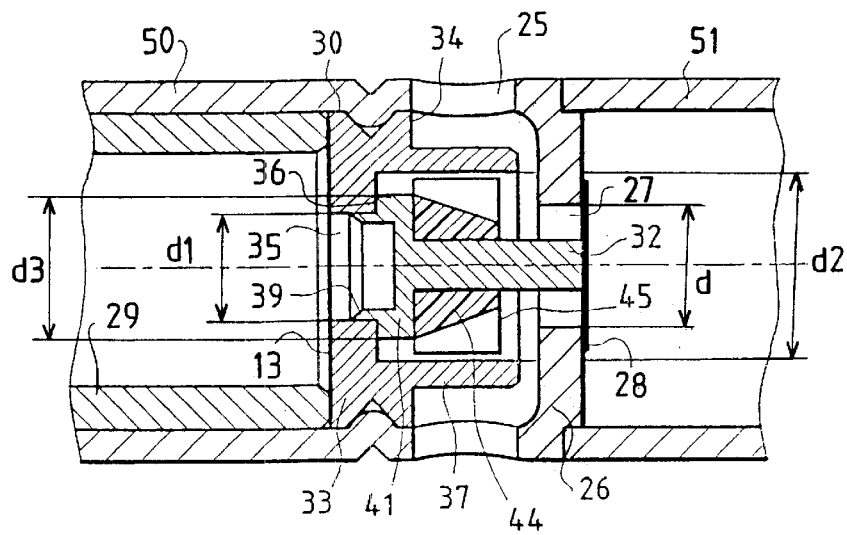
FIGS. 2 to 4 are close-up views of the generator depicted in FIG. 1 in the region containing the supporting, the mobile piston and the internal partition, the views being respectively prior to pyrotechnic operation, at the start of pyrotechnic operation and during pyrotechnic operation.
Figure 5:
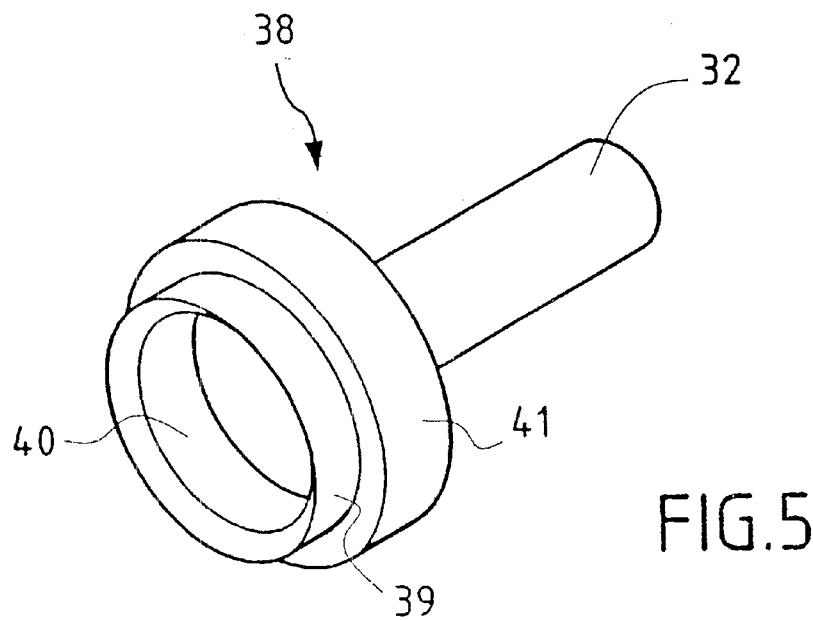
FIG. 5 is a perspective view of the body of the mobile piston.
Figure 6:
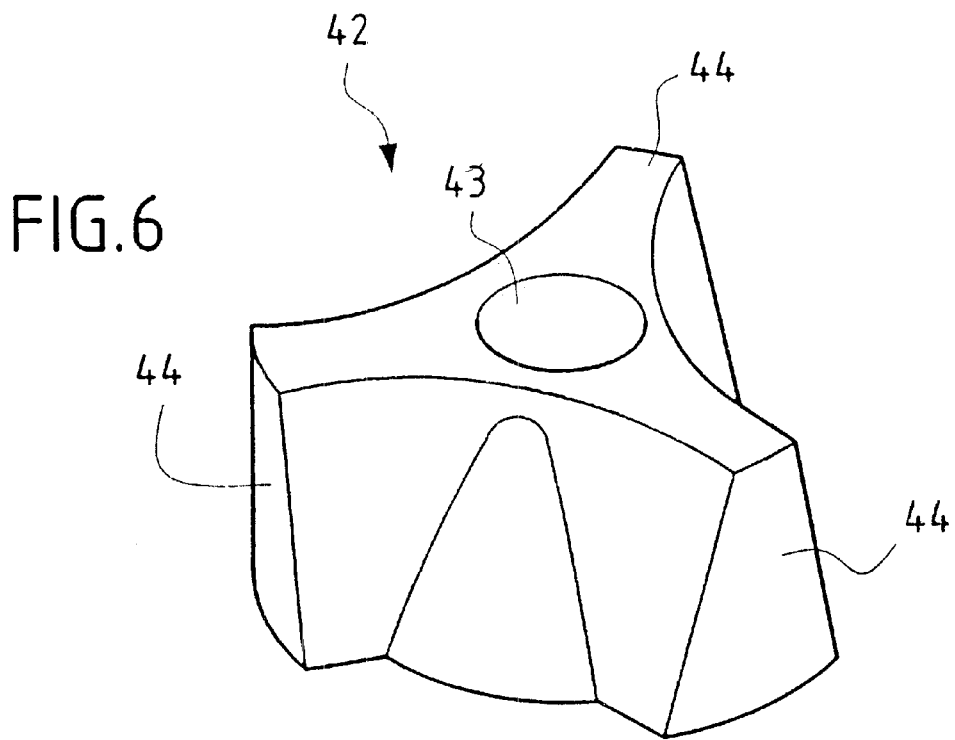
FIG. 6 is a perspective view of the single piece intended to be force fitted onto the column of the piston.

The support piece 30 and the mobile piston 31 are now described in detail with more particular reference to FIG. 2 and also to FIGS. 5 and 6 in the case of the piston 31.

The support piece 30 is a metal piece consisting of a hollow cylindrical ring 33 which comes into contact with the spacer piece 20 and which is fixed by crimping into the tube 2, the downstream fat surface 34 of this ring 33 being at the upstream extremity of the orifices 25, without blocking them off. The ring 33 has a central cylindrical recess 35 which has an internal shoulder 36. The recess 35 thus has a diameter $d_1$ facing the pyrotechnic charge 16 and a different diameter $d_2$ facing the internal partition 26, $d_2$ being greater both than $d_1$ and than the diameter d of the central orifice 27 of the partition 26. The hollow ring 33 is extended facing the internal partition 26 by a hollow cylindrical neck 37 which does not come into contact with the said partition 26. The inside diameter of this neck 37 is equal to $d_2$, whereas its outside diameter is smaller than the inside diameter of the tube body 50.

The piston 31 consists, on the one hand, of a cylindrical metal body 38 which has a cylindrical shank 39 of outside diameter $d_1$ and has a central cavity 40, the role of which will be explained after on in the description. The body 38 also has a solid cylindrical base 41 of outside diameter $d_3$, which is between $d_1$ and $d_2$. Finally, the body 38 has a cylindrical column 32 of cross section s and length 1. The body 38 consists of a single metal piece, the column 32 being obtained by upsetting the metal which initially occupied the volume of the cavity 40.

The piston 31 also consists of a single piece 42 made of rigid plastic of uniform height h and having a cylindrical central duct 43 of cross section s allowing the said piece 42 to be force fitted onto the column 32 of the body 38 to form the piston 31. The single piece 42 has 3 ateral sectors in the form of fins 44. The height h of the single piece 42 and therefore of the fins 44 is less than the length l of the column 32 and even, in the embodiment depicted, less than the height of the neck 37 of the support piece 30.

The maximum diametral size of the single piece 42 is also equal to $d_2$.

When the piston 31 has been formed, the piece 42 rests on the base 41 of the body 38 and the fins 44 surround the column 32, thus constituting, with respect to this column, external ribs 45.

When the piston 31 has been formed and after it has been fitted into the support piece 30, the shank 39 of the body 38 enters the upstream part of the recess 35. When this happens, the hollow support piece 30 and the piston 31 separate in gastight manner the gas outlet orifices 25 and the pyrotechnic charge 16 contained in the pyrotechnic device 4.

The generator 1 just described is very simple to assemble. The tube 50 is picked up, the support piece containing the mobile piston is positioned and crimped on, the diaphragm 28 is secured, the tube 51 is positioned and welded then filled with gas and sealed. All that then remains to be done is for the pyrotechnic device to be introduced and crimped in.

Figure 3:
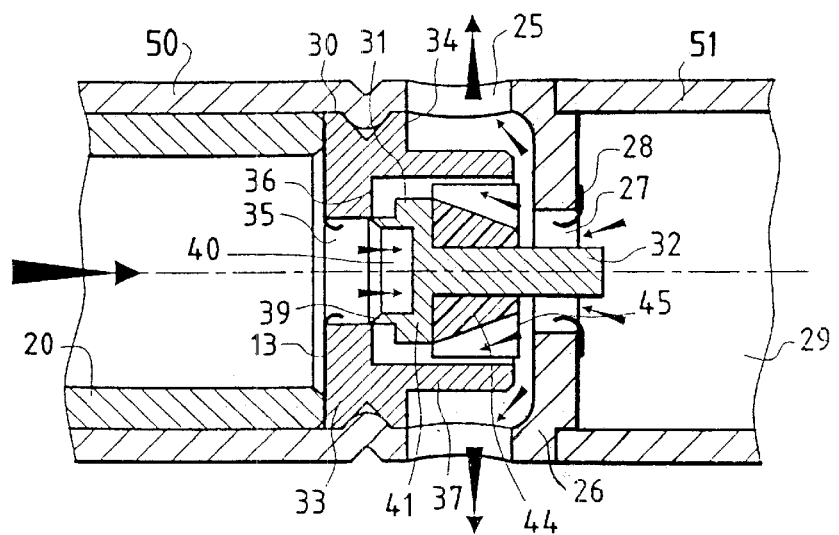
Figure 4:
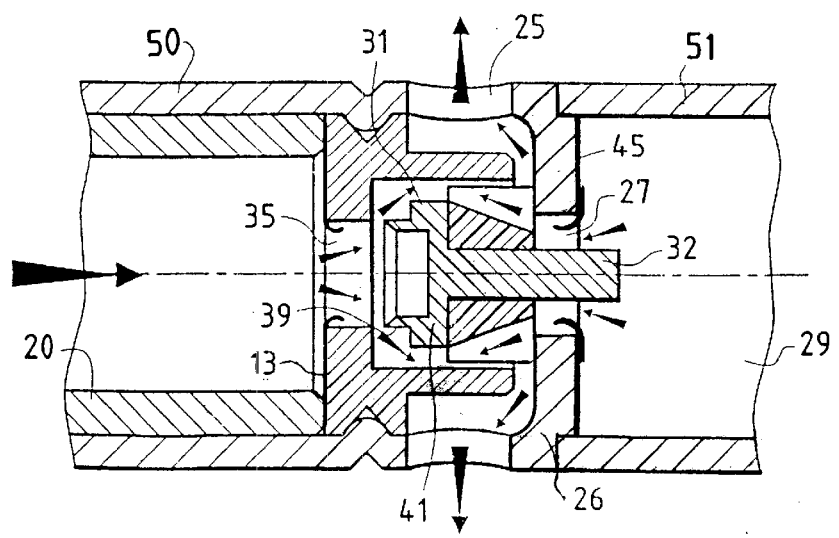

The way in which the generator thus formed works is now described with more particular reference to FIGS. 3, 4 and 8.

In the event that a collision requiring the operation of the generator is detected, an electrical signal initiates the electropyrotechnic igniter 8 which fires the pyrotechnic charge 16, the combustion gases of which cause the face 13 of the cap 11 to rupture. The hot gases therefore enter the cavity 40 of the shank 39 of the piston 31 and push it forward without being able to enter the neck 37 of the support piece 30 as long as the shank 39 is engaged in the narrow part of the recess 35 located upstream of the shoulder 36. As soon as it begins to move forward, the column 32 which is guided by the external ribs 45 causes the diaphragm 28 to rupture and the cold gases contained in the reservoir chamber 29 begin to flow back into the combustion and mixing chamber through the central orifice 27 to then leave the generator 1 via the orifices 25 without having been mixed with the hot gases. The start of deployment of the protective airbag is therefore accomplished using only cold gases which do not damage the folds of the airbag which are near the gas outlet orifices 25. This then is an additional advantage afforded by the preferred embodiment of the invention.

Under the thrust of the gases resulting from the combustion of the pyrotechnic charge 16, the piston 31 continues to move forward but its stroke is halted when the external ribs 45 come into abutment against the internal partition 26, thus preventing the base 41 of the piston 31 from blocking off the central orifice 27 of the internal partition 26. At this instant, the shank 39 of the piston 31, the length of which has to be shorter than the stroke of the piston, is no longer engaged in the narrow part of the recess 35, and the hot gases resulting from the combustion of the pyrotechnic charge 16 can enter the mixing chamber by flowing around the base 41 of the piston 31 to mix with the cold gases originating from the reservoir chamber 29 and leave the generator via the outlet orifices 25. It should be noted that the solid base 41 of the piston 31 constitutes a deflector, preventing the hot gases from passing directly to the central orifice 27 of the internal partition 26, which prevents them in practice from entering the reservoir chamber 29. For the same characteristics, the chamber 29 used in a generator according to the invention can therefore contain more gas than the same chamber used in a conventional hybrid generator which does not prevent the hot gases from entering the reservoir chamber.

What is claimed is:

1. Hybrid gas generator (1) comprising a tubular body (2) with an upstream end (3) closed by a pyrotechnic primer and hot-gas-generating device (4) and a downstream end (21) which is closed in a gastight manner, the said tubular body also having gas outlet orifices (25) and containing an internal partition (26) with a central orifice (27), of cross section S closed by a diaphragm (28), the said partition dividing the said tubular body into two parts:

an upstream part forming a combustion and mixing chamber (46) and containing the pyrotechnic device and the gas outlet orifices, a downstream part forming a reservoir chamber (29) containing at least one pressurized gas, characterized in that the said tubular body consists of two cylindrical tubes (50, 51) joined together by one of their ends, the said partition (26) being of one piece with one of the two tubes, and in that the said body, in its upstream part, between the pyrotechnic device and the said internal partition (26), contains a support piece (30) which is fixed to the said body without coming into contact with the said internal partition or with the said gas outlet orifices and which contains a solid mobile piston (31) consisting of at least one column (32) of cross section s, smaller than the cross section S, which rests against the diaphragm (28), closing the central orifice (27) of the internal partition (26), the said column (32), at its opposite end to the said partition, having a solid base (41) of cross section So larger than S and which bears peripheral ribs (45) preventing the said base (41) from coming into contact with the said central orifice (27).

2. Hybrid generator according to claim 1, characterized in that, prior to pyrotechnic operation, the said support piece (30) and the said solid mobile piston (31) isolate the said pyrotechnic device (16) from the said gas outlet orifices (25).

3. Hybrid generator according to claim 2, characterized in that the said support piece (30) consists of a hollow ring (33) crimped against the body (2) of the generator (1), the said ring having a central cylindrical recess (35) which has an internal shoulder (36) so that it has a diameter $d_1$ facing the pyrotechnic device and a diameter $d_2$ facing the internal partition (26), $d_2$ being greater than $d_1$, the said ring (33) being extended, facing the internal partition (26), by a hollow cylindrical neck (37), the inside diameter of which is equal to $d_2$, and the outside diameter of which is smaller than the inside diameter of the tubular body (2).

4. Hybrid generator according to claim 3, characterized in that the said mobile piston (31) consists, on the one hand, of a cylindrical body (38) which has a cylindrical shank (39) of outside diameter $d_1$, a cylindrical base (41) of outside diameter $d_3$ between $d_1$ and $d_2$ and a cylindrical column (32) of cross section s and of length l and, on the other hand, of fins (44) of height h smaller than the length l which surround the column (32) and which rest on the base (41) of the said body, the said fins constituting the peripheral ribs (45).

5. Hybrid generator according to claim 4, characterized in that the said fins (44) constitute a single piece (42) exhibiting a cylindrical central duct of cross section s, the said piece being force fitted onto the said column (32) of the cylindrical body (38) of the mobile piston.

6. Hybrid generator according to claim 5, characterized in that the said cylindrical body (38) is a metal body and in that the said piece (42) is made of a rigid plastic.

7. Hybrid generator according to claim 1, characterized in that the tubes (50, 51) have the same outside diameters and are joined together by welding.

8. Hybrid generator according to claim 7, characterized in that the internal partition (26) is of one piece with the tube that forms the upstream part.

* * * * *